US008730527B2

(12) United States Patent
Chapman et al.

(10) Patent No.: US 8,730,527 B2
(45) Date of Patent: May 20, 2014

(54) EMBEDDING INFRARED MARKS IN GLOSS SECURITY PRINTING

(71) Applicant: Xerox Corporation, Norwalk, CT (US)

(72) Inventors: Edward N. Chapman, Rochester, NY (US); Francis K. Tse, Rochester, NY (US); Shen-ge Wang, Fairport, NY (US); Reiner Eschbach, Webster, NY (US); Yonghui Zhao, Cupertino, CA (US)

(73) Assignee: Xerox Corporation, Norwalk, CT (US)

( * ) Notice: Subject to any disclaimer, the term of this patent is extended or adjusted under 35 U.S.C. 154(b) by 72 days.

(21) Appl. No.: 13/628,253

(22) Filed: Sep. 27, 2012

(65) Prior Publication Data

US 2014/0085392 A1 Mar. 27, 2014

(51) Int. Cl.
*H04N 1/40* (2006.01)

(52) U.S. Cl.
USPC .......... 358/3.28

(58) Field of Classification Search
USPC .......... 347/15, 98, 100, 106, 107, 111; 358/1.9, 3.09, 3.28
See application file for complete search history.

(56) References Cited

U.S. PATENT DOCUMENTS

| | | | | |
|---|---|---|---|---|
| 6,032,004 | A | 2/2000 | Mirabella, Jr. et al. | |
| 7,639,400 | B2 | 12/2009 | Hains | |
| 7,852,515 | B2 * | 12/2010 | Eschbach et al. | 358/3.28 |
| 7,894,103 | B2 * | 2/2011 | Wang et al. | 358/3.28 |
| 8,064,100 | B2 | 11/2011 | Braun et al. | |
| 8,064,102 | B1 | 11/2011 | Zhao et al. | |
| 8,111,432 | B2 | 2/2012 | Eschbach et al. | |
| 8,482,802 | B2 * | 7/2013 | Tai et al. | 358/3.06 |
| 2008/0302263 | A1 | 12/2008 | Eschbach et al. | |
| 2008/0305444 | A1 | 12/2008 | Eschbach et al. | |
| 2010/0128321 | A1 | 5/2010 | Wang et al. | |
| 2010/0231980 | A1 | 9/2010 | Chapman et al. | |

* cited by examiner

*Primary Examiner* — Kristal Feggins
(74) *Attorney, Agent, or Firm* — Gibb & Riley, LLC

(57) ABSTRACT

A processor controls a marking engine to print a uniform region having a visually uniform color for an observer within all areas of the uniform region. The processor also controls the marking engine to print different gloss patterns within the uniform region. The different gloss patterns have first and second gloss regions, and the gloss difference between the first and second gloss regions forms gloss marks. Additionally, the processor controls the marking engine to print different infrared patterns within the uniform region to form infrared marks. In some embodiments, the infrared patterns are only within the first gloss regions and are not within the second gloss regions.

24 Claims, 5 Drawing Sheets

EMBEDDING INFRARED MARKS IN GLOSS SECURITY PRINTING

BACKGROUND

Embodiments herein generally relate to security printing and more particularly to systems, devices, and methods that print gloss marks and infrared marks that overlap one another within a uniform region.

In the area of security printing, documents are protected from copying, forging and counterfeiting using multiple techniques. Some methods of security printing use standard materials such as papers inks and toners; however, more typically security printing requires special and expensive materials. Example documents needing security printing include legal documents, negotiable documents, prescriptions, etc., where a user would like to be able to have a high level of confidence that the document is genuine.

Some printing techniques enable printing small overt security features that could not easily be copied by a digital copier, if at all. However documents protected with such features can potentially be reproduced with reverse engineering.

SUMMARY

An exemplary method controls a marking engine using a processor to print a uniform region having a visually uniform color for a normal observer within all areas of the uniform region on printing media. The method also controls the marking engine (using the processor) to print different gloss patterns within the uniform region. The different gloss patterns have first (e.g., relatively higher ink-pile level) gloss regions and second (e.g., relatively lower ink-pile level) gloss regions. The gloss is created off the sides between the regions, and the regions can have similar gloss. The gloss level difference at the boundaries between the first and second gloss regions forms "gloss marks" which can be numbers, characters, images, structures, glyphs, etc. The method further controls the marking engine (using the processor) to print different infrared patterns within the uniform region to form "infrared marks" which can also be numbers, characters, images, structures, etc.

The method can further control the marking engine (using the processor) to print a plurality of the uniform regions. In such cases, the gloss marks and the infrared marks are positioned to cross the uniform regions.

In some embodiments, the infrared patterns are positioned only within the first (high-ink-pile level) gloss regions and are not positioned within the second (low-ink-pile level) gloss regions. Thus, the gloss marks and the infrared marks overlap one another within the uniform region. The gloss marks are only observable at a non-perpendicular angle to the printed media that reflects different gloss levels differently (as shown in FIG. 7), and the infrared marks are only observable within the infrared spectrum of electromagnetic radiation.

A printing apparatus embodiment herein includes a processor, a media path operatively (directly or indirectly) connected to the processor, a media storage unit at one end of the media path, and a marking engine positioned along the media path to receive printing media from the media storage. The marking engine prints marks on the printing media to produce printed media. Further, an output unit is at a second end of the media path. The output unit outputs the printed media.

The processor controls the marking engine to print a uniform region having the visually uniform color for an observer within all areas of the uniform region. The processor also controls the marking engine to print different gloss patterns within the uniform region. The different gloss patterns have first and second gloss regions, and the gloss difference at the boundaries between the first and second gloss regions forms gloss marks. Additionally, the processor controls the marking engine to print different infrared patterns within the uniform region to form infrared marks. In some embodiments, the infrared patterns are only within the first gloss regions and are not within the second gloss regions.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, some printing techniques enable printing small overt security features that are not easily copied by a digital copier. To provide security without using specialized and expensive equipment and toners, devices and methods herein utilize small overt security features within multiple gloss levels and infrared marks (e.g., watermarks). This accomplishes security, with a minimum of three-different combinations of gloss and infrared marks, so that the infrared watermark is a subset of the gloss level watermark. While gloss level can be viewed without a special tool, the infrared signal requires a special tool such as an infrared camera to verify. The infrared embedded gloss level appears the same as the non-infrared version without the infrared camera.

Markings made using gloss level differentiation (sometimes referred to herein as gloss level markings) is a security technique that does not require a special tool to view, and is an especially strong anti-copying technique. Gloss level markings use a pair of colors that appear to be about the same CMYK (cyan, magenta, yellow, black) color when viewing straight on (perpendicular to the page) but show a differential gloss when tilting due to the pile height of the toner or ink. One example would be $C_{low}$=K and $C_{high}$=CMYK where high and low indicate gloss pile height and gloss level.

Figure 1:
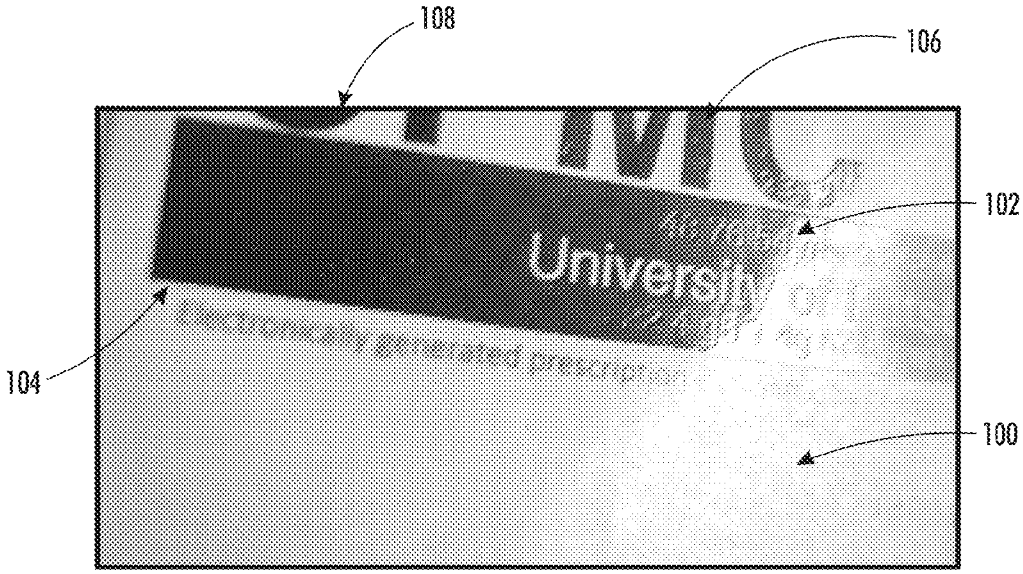
FIG. 1 is an image printed according to embodiments herein.

FIG. 1 shows an example of a printed item 100 having gloss level markings 102 (numbers "48"; "76"; "54"; etc.) that are positioned within an otherwise uniform region 104. The center and right-side portions of the sheet 100 shown in FIG. 1 are viewed at a non-perpendicular angle with non-perpendicular lighting to allow the gloss differentiation to be easily viewed. When viewed from a perpendicular angle to the sheet (as shown on the left side of FIG. 1) the gloss differentiation is not easily viewed, and would not be copied with a copier.

Note that in FIG. 1, typically the gloss glyphs in the entire black rectangle 104 are visible under typical overhead office illumination. For the picture shown in FIG. 1, a small LED was the light source. Also, FIG. 1 illustrates that parts 106 of the text over the black box exhibit the gloss level markings (seen at a non-perpendicular angle) and other parts 108 do not (because they are viewed from a perpendicular angle) even though all of the text over the black box along with the black box 104 contain the small overt security features of the gloss level markings.

To add another level of protection to the security printing, the devices and methods herein provide a two level anti-copying/anti-fraud feature by embedding infrared watermarks within the gloss level markings. The first level provides human-readable gloss level markings of text or other designs to show content on the page that cannot be copied with digital copiers and scanners. At the second level, infrared marks are embedded in all or a part of the gloss level markings. This provides a covert message that forgers could miss when they presume that all they need to do is to defeat the overt gloss level anti-copying feature. Effectively, the infrared watermark signal is disguised as a visible gloss level feature to divert the attention of a forger who would otherwise look for ways to defeat the infrared mark if that was a clearly noticeable security feature.

In the gloss level marking process, two different colorant quadruplets can have a constant or almost constant "black" color, but have different gloss levels. In essence, the gloss level marking process alternates between k-black and rich-black, for example between (0,0,0,255) and (255,255,255, 255). This is a simplified view ignoring, for example, ink limits of a certain device. One component of gloss level markings is fine detail behavior. In order to get a good differential gloss, the gloss level markings use small character structures. Small structures loosen the requirement on color matching, because fine detail color changes are much harder to see than fine detail luminance changes. With this additional input, the gloss level markings use a second quadruplet pair of (0,0,0,205) & (255,255,255,205).

In order to get an infrared signature, the devices and methods herein alternate between the two different quadruplet pairs. The infrared contrast can actually be very low (20% in one numerical example, but roughly 10%-20% in actual prints), but that it is still easily viewable with standard infrared cameras.

Figure 2:
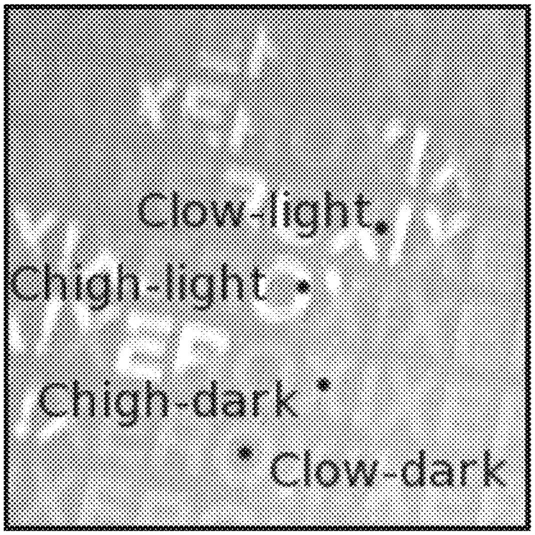
FIG. 2 is an image printed according to embodiments herein.

As shown in FIG. 2, to further simplify the explanation of the devices and methods herein, one example uses only three of the four color quadruplets of pixels, designated "C", with $C_{low}$ and $C_{high}$, being the original pre-infrared case and $C_{high\text{-}light}C_{high\text{-}dark}$ and $C_{low}$ the color quadruplets used in this ID. Note that in FIG. 2, while $C_{low\text{-}light}$ $C_{low\text{-}dark}$ have been given different designations, they produce the same appearance and are considered the same for this example, thus effectively using only three of the four quadruplets. The "light" designates a light color, and "dark" designates a dark color when viewed with an infrared camera. Again, the color triplets appear to be about the same color when viewed straight on from an angle perpendicular to the sheet of media. Gloss level markings are printed using the "high" and "low" quadruplet pair and the infrared signal embedded with the "light" and "dark" quadruplets pair.

Besides embedding the infrared information via the $C_{high\text{-}light}$ and $C_{high\text{-}dark}$ pair, the infrared printing can also be embedded with another pair of pixels $C_{low\text{-}light}$ and $C_{low\text{-}dark}$ creating a color quadruplet to embed the gloss level and infrared via a cross combination of color pairs. While using the low color quadruplet pair ($C_{low\text{-}dark}$ and $C_{low\text{-}light}$), this produces a better infrared print and gloss level; however, when using such a low color quadruplet pair, the colors are no longer the same viewed straight on. Therefore, in applications where hiding the gloss level markings is less important, the low color quadruplet pair are used, which provides a better infrared print. Where hiding the gloss level markings is more important, the high color quadruplet pair is used.

Figure 3:
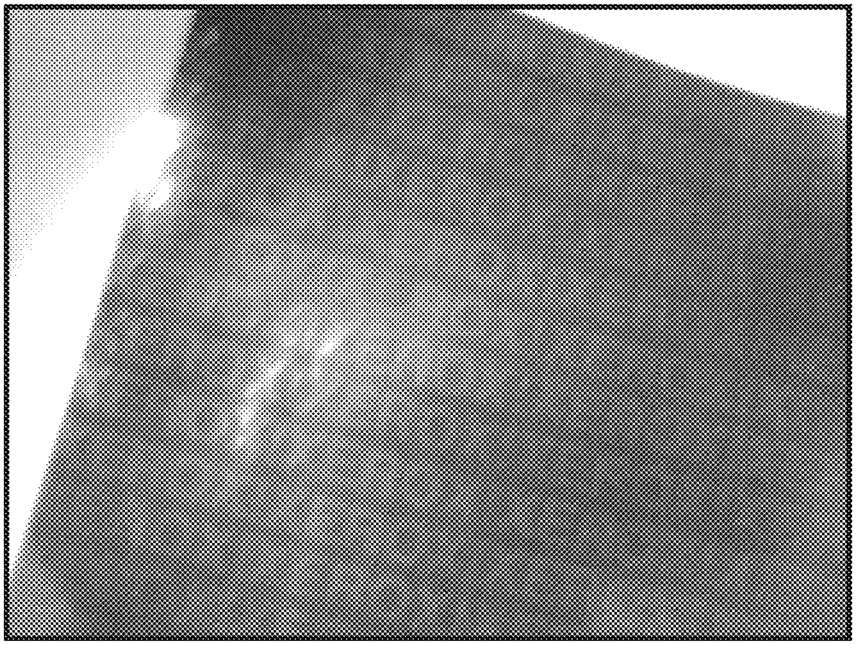
FIG. 3 is an image printed according to embodiments herein.
Figure 4:
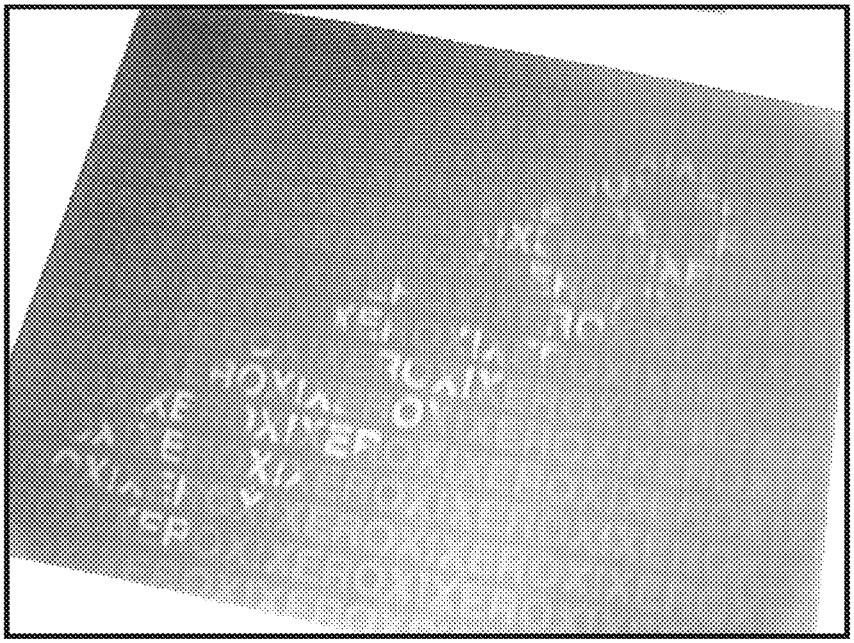
FIG. 4 is an image printed according to embodiments herein.
Figure 5:
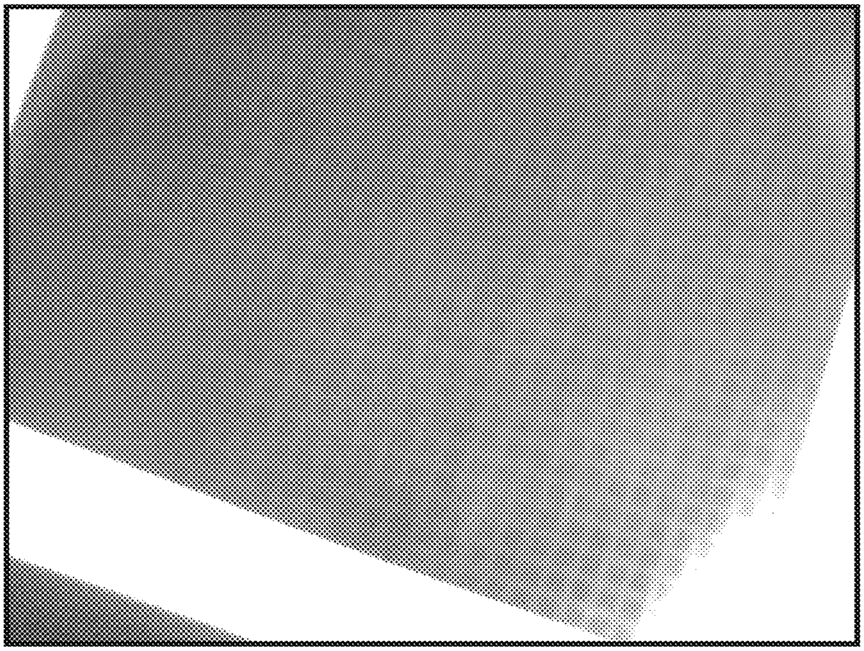
FIG. 5 is an image printed according to embodiments herein.
Figure 6:
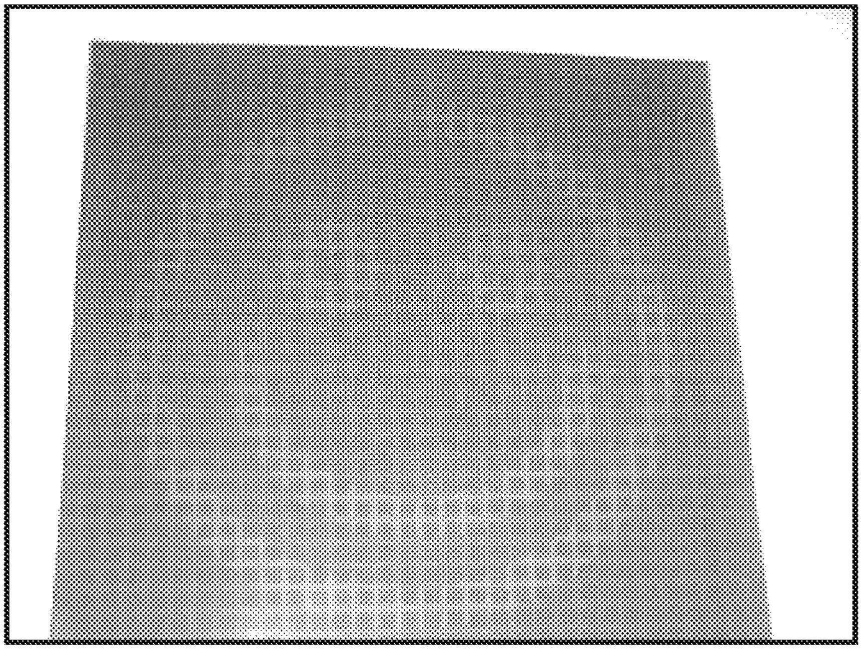
FIG. 6 is an image printed according to embodiments herein.

FIG. 3 shows gloss level markings of the text with the repeated string "XEROX!" which is a larger image of that shown in FIG. 2 (without the use of an infrared camera). Again, when viewed by an observer perpendicular to the media sheet or by a scanner, the images shown in FIGS. 2-6 this would appear black, however, the small overt security features show when the sheet is tilted at a non-perpendicular angle. FIG. 4 is the same image shown in FIGS. 2-3 viewed with an infrared camera where "VALID" can now be seen. FIGS. 5 and 6 show another example using squares instead of text and a smiley face in place of the infrared text "VALID".

Figure 7:
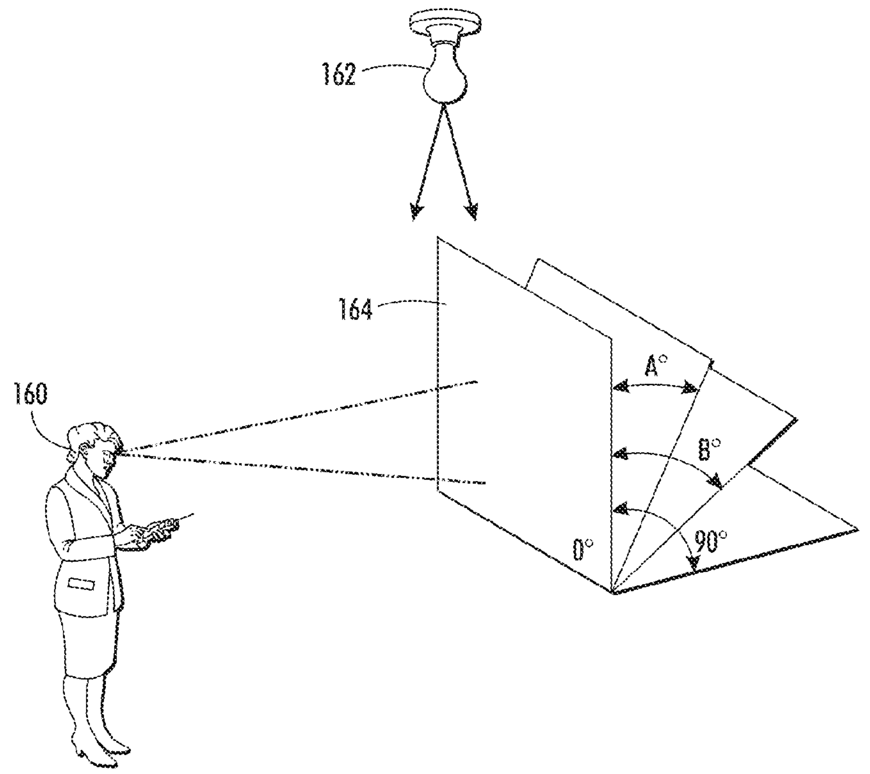
FIG. 7 is a side-view schematic diagram illustrating effects achieved by embodiments herein.

As mentioned above, the gloss marks are only observable at a non-perpendicular angle to the printed media that reflects different gloss levels differently. As shown in FIG. 7, the observation of the gloss marks depends on the relative positions of the light source 162, the observer 160, and the printed sheet 164. As shown in FIG. 7, the observer 160 would not distinguish between different gloss levels when the printed sheet 164 is viewed at a perpendicular angle (e.g., at 0°). However, as the printed sheet of media 164 is tilted so that the printed sheet 164 is viewed at a non-perpendicular angle (e.g., at A°, B°, etc.) the gloss markings will become visible to the observer 160. As the tilting of the printed sheet 164 continues, the gloss markings will still be visible until a certain angle (arbitrarily shown as angleB°) where they remain unseen to 90°. As would be understood by those ordinarily skilled in the art, the angles between which the gloss markings are visible (e.g., A° and B° in this arbitrary example) will change as the position between the light source 162, the observer 160, and the printed sheet 164 change.

Thus, as shown in greater detail below, the devices and methods herein provide an approach to make current covert gloss level more difficult to copy, reverse engineer or reproduce via digital machines by using the gloss level markings as a "decoy" to embed an infrared watermark within the gloss level markings.

Figure 8:
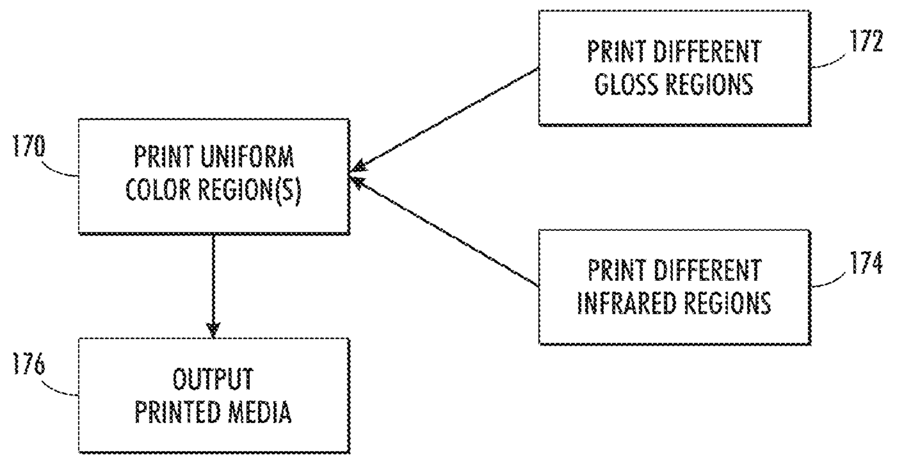
FIG. 8 is a flow diagram illustrating various embodiments herein.

FIG. 8 is flowchart illustrating an exemplary method herein. This exemplary method controls a marking engine using a processor to print a uniform region in item 170. The uniform region is referred to as being uniform because each uniform region has a uniform CMYK color or color pattern throughout. In other words, the same CMYK color or color pattern (without regard to gloss) is the consistent within all areas of each uniform region. Further, there may be many uniform regions adjacent to one another, or the uniform region may be a graduated color, be multi-color, or have patterns of color, but such patterns are consistent and uniform throughout each uniform region, when the sheet of printed media is viewed from a perpendicular angle.

While printing in item 170, as shown by item 172, the method controls the marking engine (again using the processor) to print different gloss patterns within the uniform region. Any conventionally known method of printing gloss patterns (such as those disclosed in U.S. Patent Publication 2010/

0128321, relevant portions relating to gloss patterning techniques of which are incorporated herein by reference) or any gloss patterning methods developed in the future can be used with embodiments herein. The different gloss patterns have first (e.g., relatively higher (or lower)) gloss regions and second (e.g., relatively lower (or higher)) gloss regions (based, for example, on the height of the toner or ink printed). In other words, the first gloss regions have the same CMYK color, but have a different gloss level (either higher or lower) when compared to the second gloss regions.

Thus, the first and second gloss regions appear about the same when viewed perpendicular (at 0°) to the printed media, but show a differential gloss when tilting (viewed at a non-perpendicular angle to the printed media) due to the pile height of the toner or ink. The gloss difference at the boundaries between the first and second gloss regions produced by item 172 forms "gloss marks" that can only be observed when viewing at a non-perpendicular angle to the printed media. The gloss marks can be numbers, characters, images, structures, etc.

While printing in item 170, as shown by item 174, the method controls the marking engine (using the processor) to print different infrared patterns within the uniform region to form "infrared marks." The method can then output the printed media as shown by item 176. Again, any infrared printing method, whether currently known or developed in the future, can be used with embodiments herein. The infrared marks can be numbers, characters, images, structures, etc.

In item 170, the method can further control the marking engine (using the processor) to print a plurality of the uniform regions on a given printing area (e.g., a sheet of print media). In such cases, the gloss marks and the infrared marks can be positioned to continue across the uniform regions.

In some embodiments, the infrared patterns can be positioned only within the first (high) gloss regions and are not positioned within the second (low) gloss regions of the gloss marks. This embodiment therefore essentially uses three types pixels of the same CMYK color (color triplets) to cause the underlying gloss mark pattern to appear within the infrared marks (see FIGS. 4 and 6). Within a given uniform region, one of the pixel types has a first gloss level, a second pixel type has a second gloss level and has a first infrared marking level, and a third pixel type also has the second gloss level, but has a different infrared marking level.

By using three such distinct gloss/infrared characteristics for the pixels, the infrared marks form larger characters, structures, or pictures that are patterned by the underlying gloss marks. This is shown most clearly in FIGS. 4 and 6 where the letters (and smiley face) are not formed from full, unbroken block marks, but instead are block marks that are broken by the underlying pattern of the gloss marks. For example, the letter "I" in the diagonal word "VALID" in FIG. 4 is not a solid letter, but is instead a letter having an embedded pattern where the solid letter is interrupted by the underlying gloss marks that form the word "XEROX!" and this provides an additional security feature by indicating to the user that something below the word "VALID" should be observable in the original document. If only the infrared "VALID" appears, without the underlying gloss marks forming the word "XEROX!" the user would be made aware that the document is a copy or forgery. Therefore, by utilizing a combination of the gloss marks and infrared marks that are patterned by the underlying gloss marks, the infrared watermark is a subset of the gloss level watermark and additional security is provided that is greater than an unpatterned combination of overlaid gloss marks and infrared marks.

Thus, as shown above, the gloss marks and the infrared marks overlap one another within the uniform region and the infrared watermark is a subset of the gloss level watermark. The gloss marks are only observable at a non-perpendicular angle to the printed media that reflects different gloss levels differently, and the infrared marks are only observable within the infrared spectrum of electromagnetic radiation.

Figure 9:
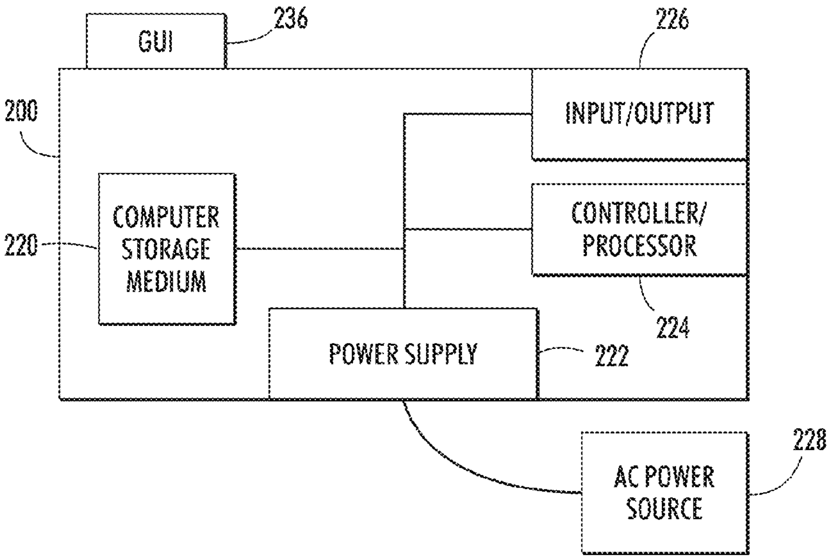
FIG. 9 is a side-view schematic diagram of a device according to embodiments herein.

FIG. 9 illustrates a computerized device 200, which can be used with embodiments herein and can comprise, for example, a print server, a personal computer, a portable computing device, etc. The computerized device 200 includes a controller/processor 224 and a communications port (input/output) 226 operatively connected to the processor 224 and to a computerized network external to the computerized device 200. Also, the computerized device 200 can include at least one accessory functional component, such as a graphic user interface assembly 236 that also operates on the power supplied from the external power source 228 (through the power supply 222).

The input/output device 226 is used for communications to and from the computerized device 200. The processor 224 controls the various actions of the computerized device. A non-transitory (non-volatile) computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 9, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 10:
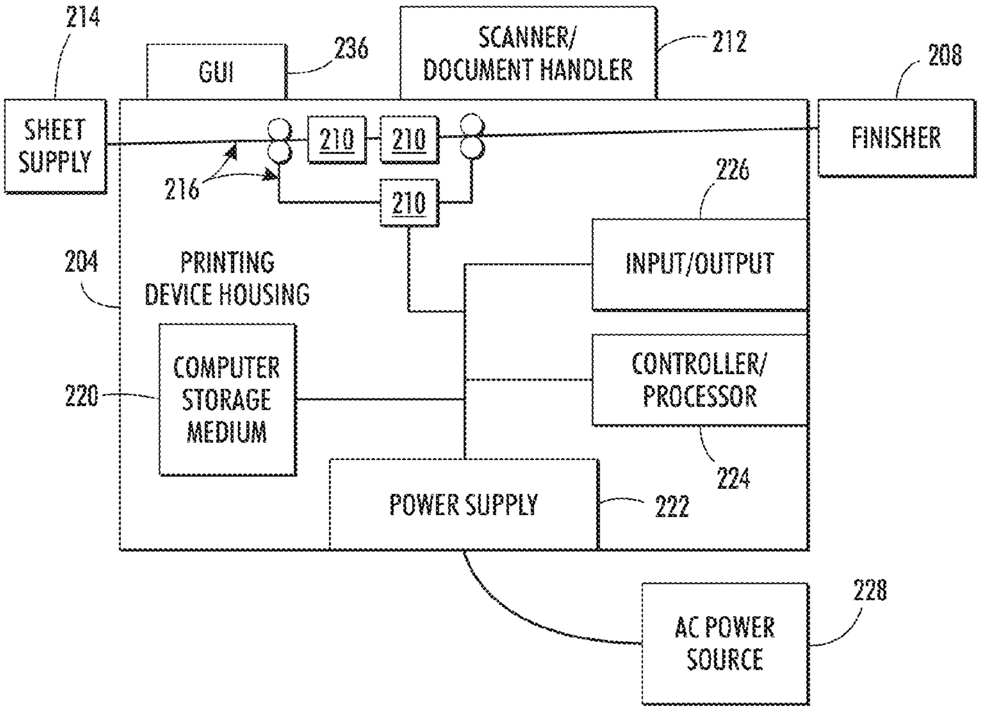
FIG. 10 is a side-view schematic diagram of a device according to embodiments herein.

FIG. 10 illustrates a computerized device that is a printing device 204, which can be used with embodiments herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

In either type of device, the processor 224 controls the marking engine 210 to print a uniform region having the visually uniform color for an observer within all areas of the uniform region. The processor 224 also controls the marking engine 210 to print different gloss patterns within the uniform region. The different gloss patterns have first and second gloss regions, and the gloss difference at the boundaries between the first and second gloss regions forms gloss marks. Additionally, the processor 224 controls the marking engine 210 to print different infrared patterns within the uniform region to form infrared marks. In some embodiments, the infrared patterns are only within the first gloss regions and are not within the second gloss regions.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art. The embodiments herein can encompass embodiments that print in color, monochrome, or handle color or monochrome image data. All foregoing embodiments are specifically applicable to electrostatographic and/or xerographic machines and/or processes.

In addition, terms such as “right”, “left”, “vertical”, “horizontal”, “top”, “bottom”, “upper”, “lower”, “under”, “below”, “underlying”, “over”, “overlying”, “parallel”, “perpendicular”, etc., used herein are understood to be relative locations as they are oriented and illustrated in the drawings (unless otherwise indicated). Terms such as “touching”, “on”, “in direct contact”, “abutting”, “directly adjacent to”, etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A printing apparatus comprising:

a processor;

a media path operatively connected to said processor;

a media storage unit at one end of said media path;

a marking engine positioned along said media path to receive printing media from said media storage, said marking engine printing marks on said printing media to produce printed media; and an output unit at a second end of said media path, said output unit outputting said printed media, said processor controlling said marking engine to print a uniform region having a visually uniform color for an observer within all areas of said uniform region, said processor controlling said marking engine to print different gloss patterns within said uniform region, said different gloss patterns forming gloss marks, and said processor controlling said marking engine to print different infrared patterns within said uniform region to form infrared marks.

2. The printing apparatus according to claim 1, said gloss marks and said infrared marks overlapping one another within said uniform region.

3. The printing apparatus according to claim 1, said gloss marks being only observable at a non-perpendicular angle to said printed media that reflects different gloss levels differently.

4. The printing apparatus according to claim 1, said infrared marks being only observable within the infrared spectrum of electromagnetic radiation.

5. The printing apparatus according to claim 1, said processor controlling said marking engine to print a plurality of said uniform region to create uniform regions.

6. The printing apparatus according to claim 5, said gloss marks and said infrared marks being positioned to cross said uniform regions.

7. A printing apparatus comprising:

a processor;

a media path operatively connected to said processor;

a media storage unit at one end of said media path;

a marking engine positioned along said media path to receive printing media from said media storage, said marking engine printing marks on said printing media to produce printed media; and an output unit at a second end of said media path, said output unit outputting said printed media, said processor controlling said marking engine to print a uniform region having a visually uniform color for an observer within all areas of said uniform region, said processor controlling said marking engine to print different gloss patterns within said uniform region, said different gloss patterns having first gloss regions and second gloss regions, a gloss difference between said first gloss regions and said second gloss regions forming gloss marks, said processor controlling said marking engine to print different infrared patterns within said uniform region to form infrared marks, and said infrared patterns being only within said first gloss regions and not within said second gloss regions.

8. The printing apparatus according to claim 7, said gloss marks and said infrared marks overlapping one another within said uniform region.

9. The printing apparatus according to claim 7, said gloss marks being only observable at a non-perpendicular angle to said printed media that reflects different gloss levels differently.

10. The printing apparatus according to claim 7, said infrared marks being only observable within the infrared spectrum of electromagnetic radiation.

11. The printing apparatus according to claim 7, said processor controlling said marking engine to print a plurality of said uniform region to create uniform regions.

12. The printing apparatus according to claim 11, said gloss marks and said infrared marks being positioned to cross said uniform regions.

13. A method comprising:

controlling a marking engine using a processor to print a uniform region having a visually uniform color for an observer within all areas of said uniform region on printing media;

controlling said marking engine using said processor to print different gloss patterns within said uniform region, said different gloss patterns forming gloss marks; and controlling said marking engine using said processor to print different infrared patterns within said uniform region to form infrared marks.

14. The method according to claim 13, said gloss marks and said infrared marks overlapping one another within said uniform region.

15. The method according to claim 13, said gloss marks being only observable at a non-perpendicular angle to said printed media that reflects different gloss levels differently.

16. The method according to claim 13, said infrared marks being only observable within the infrared spectrum of electromagnetic radiation.

17. The method according to claim 13, further comprising controlling said marking engine using said processor to print a plurality of said uniform region to create uniform regions.

18. The method according to claim 17, said gloss marks and said infrared marks being positioned to cross said uniform regions.

19. A method comprising:

controlling a marking engine using a processor to print a uniform region having a visually uniform color for an observer within all areas of said uniform region on printing media;

controlling said marking engine using said processor to print different gloss patterns within said uniform region, said different gloss patterns having first gloss regions and second gloss regions, a gloss difference between said first gloss regions and said second gloss regions forming gloss marks; and controlling said marking engine using said processor to print different infrared patterns within said uniform region to form infrared marks, said infrared patterns being only within said first gloss regions and not within said second gloss regions.

20. The method according to claim 19, said gloss marks and said infrared marks overlapping one another within said uniform region.

21. The method according to claim 19, said gloss marks being only observable at a non-perpendicular angle to said printed media that reflects different gloss levels differently.

22. The method according to claim 19, said infrared marks being only observable within the infrared spectrum of electromagnetic radiation.

23. The method according to claim 19, further comprising controlling said marking engine using said processor to print a plurality of said uniform region to create uniform regions.

24. The method according to claim 23, said gloss marks and said infrared marks being positioned to cross said uniform regions.

* * * * *